United States Patent
Marino et al.

(10) Patent No.: US 8,505,191 B2
(45) Date of Patent: Aug. 13, 2013

(54) METHOD FOR ASSEMBLING ELECTRIC POWER SUPPLY CABLES ON A STATOR

(75) Inventors: Michele Marino, Turin (IT); Gianfranco Arato, Chieri (IT)

(73) Assignee: Embraco Europe S.r.l., Turin (IT)

( * ) Notice: Subject to any disclaimer, the term of this patent is extended or adjusted under 35 U.S.C. 154(b) by 0 days.

(21) Appl. No.: 13/381,566

(22) PCT Filed: Jul. 5, 2010

(86) PCT No.: PCT/IB2010/053074
§ 371 (c)(1),
(2), (4) Date: Dec. 29, 2011

(87) PCT Pub. No.: WO2011/004312
PCT Pub. Date: Jan. 13, 2011

(65) Prior Publication Data
US 2012/0097577 A1 Apr. 26, 2012

(30) Foreign Application Priority Data
Jul. 6, 2009 (IT) .............................. TO2009A0504

(51) Int. Cl.
*H02K 15/00* (2006.01)
(52) U.S. Cl.
USPC .................................. 29/596; 29/598; 310/71
(58) Field of Classification Search
USPC .................. 29/506–598, 732, 736, 429, 825, 29/745–768; 310/71, 203
See application file for complete search history.

(56) References Cited

U.S. PATENT DOCUMENTS

| | | | | |
|---|---|---|---|---|
| 3,555,316 A * | 1/1971 | Bleich | ............................. | 310/71 |
| 3,566,006 A * | 2/1971 | Metcalf | ...................... | 174/84 C |
| 3,748,510 A | 7/1973 | McNeal | | |
| 3,912,957 A * | 10/1975 | Reynolds | ........................ | 310/71 |
| 4,227,103 A * | 10/1980 | Humes et al. | ................... | 310/71 |
| 4,698,533 A * | 10/1987 | Kindig et al. | ................... | 310/71 |
| 7,884,514 B2 * | 2/2011 | Baumgartner et al. | ......... | 310/71 |
| 8,138,643 B2 * | 3/2012 | Fukasaku et al. | ............... | 310/71 |

FOREIGN PATENT DOCUMENTS

| | | |
|---|---|---|
| JP | 48-050202 A | 7/1973 |
| JP | 55-026012 A | 2/1980 |
| JP | 56-041739 A | 4/1981 |
| JP | 56-092455 A | 7/1981 |
| JP | 03-235636 A | 10/1991 |

* cited by examiner

*Primary Examiner* — Minh Trinh
(74) *Attorney, Agent, or Firm* — Sughrue Mion, PLLC

(57) ABSTRACT

A method of assembling electric power supply cables on a stator of an electric motor including the following steps: electrically connecting an end of each cable to an end of at least one respective wire of the winding; inserting each pair of connected ends into a respective small tube of a protection and positioning element made of insulating plastic and having a strip from which a number small tubes at least corresponding to the number of electric power supply cables transversally protrudes; clamping each small tube so as to fix it to the pair of ends inserted inside it; inserting an end of the strip inside a cavity of the pack, so that the small tubes are located within the head; and tying the winding in the region of the head so as to enclose the small tubes.

4 Claims, 5 Drawing Sheets

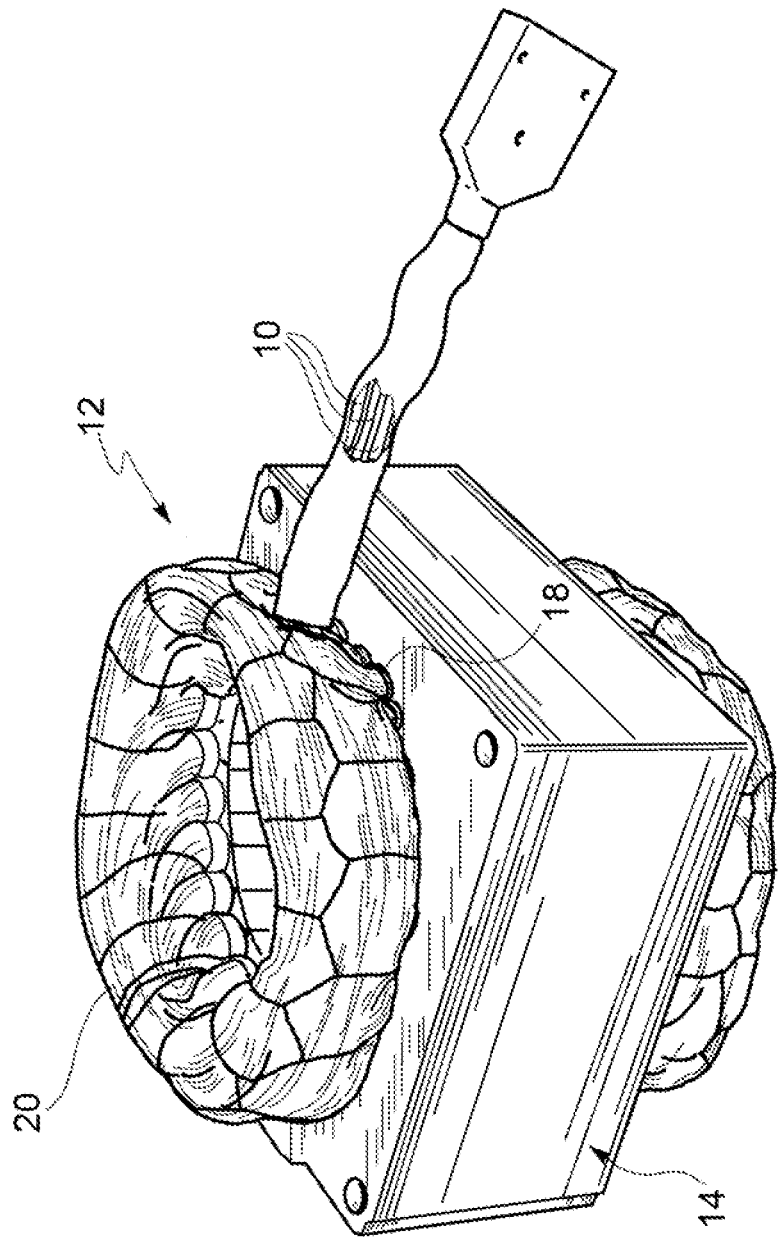

ND OF 8,505,191 B2

METHOD FOR ASSEMBLING ELECTRIC POWER SUPPLY CABLES ON A STATOR

CROSS REFERENCE TO RELATED APPLICATIONS

Figure 1:
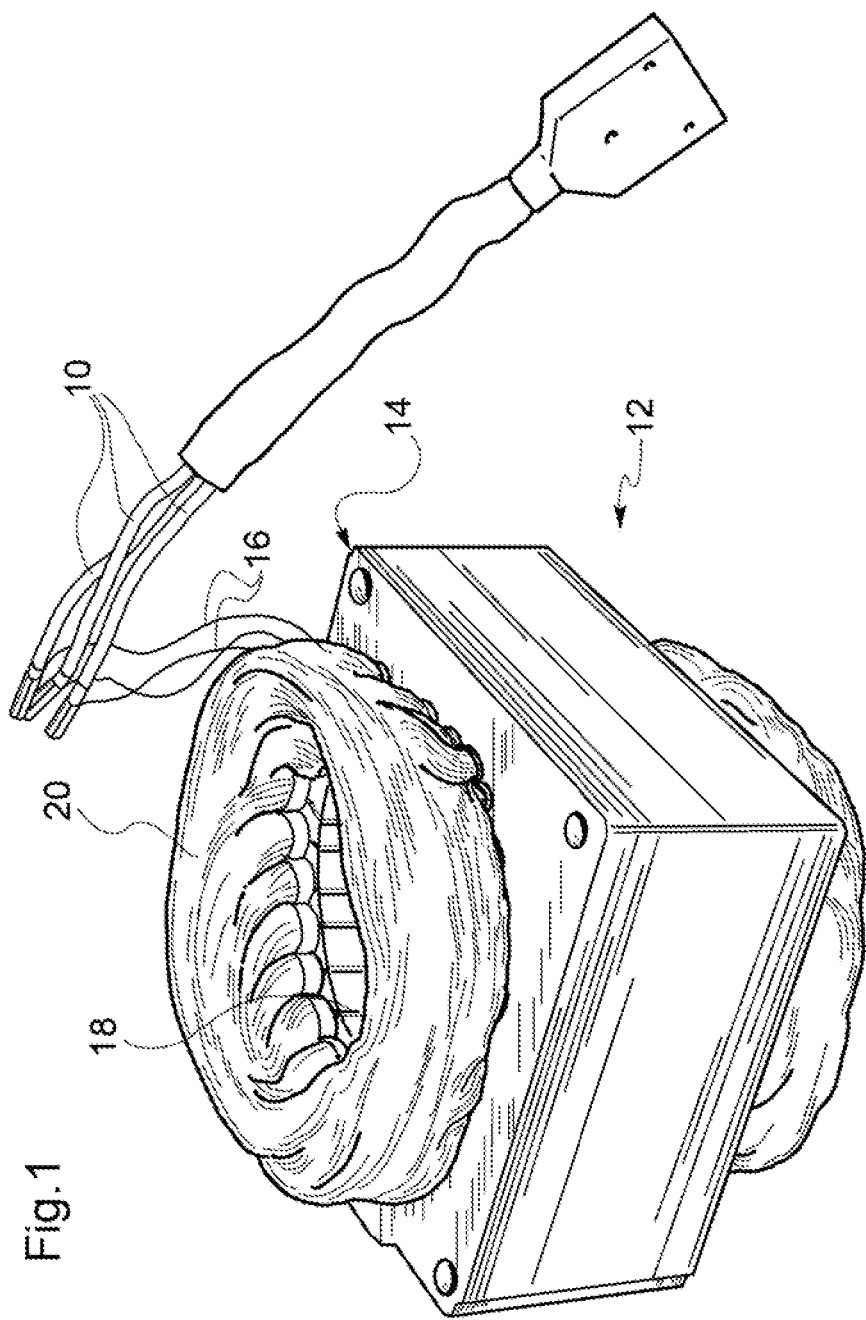

This application is a National Stage of International Application No. PCT/IB/2010/053074 filed Jul. 5, 2010, claiming priority based on Italian Patent Application No. TO2009A000504, filed Jul. 6, 2009, the contents of all of which are incorporated herein by reference in their entirety.

The present invention relates to a method for assembling electric power supply cables on a stator of an electric motor, in particular a rotary electric motor for hermetic compressors of refrigerators and the like.

Conventionally, such a stator is formed by a pack of magnetic laminations and at least one winding of bundles of electrically conductive wires housed inside cavities in the pack and having heads which project from opposite sides of the pack and to which the electric power supply cables, typically three in number, are connected.

The formation of the electrical connections between the power supply cables and the winding of the stator and their subsequent insulation are—according to the prior art—somewhat long and complex operations which are carried out manually, resulting in the employees having to perform repetitive movements which, in the long run, may give rise to illnesses, in particular of an inflammatory nature, such as carpal tunnel syndrome.

The object of the present invention is to provide a method of the type indicated above which can be performed quickly and does not constitute a risk for the health of the employees.

This object is achieved by means of a method comprising the steps of:

electrically connecting an end of each cable to an end of at least one respective wire of the winding, inserting each pair of connected ends into a respective small tube of a protection and positioning element made of insulating plastic and having a strip from which a number of small tubes at least corresponding to the number of electric power supply cables transversally protrudes, clamping each small tube so as to fix it to the pair of ends inserted inside it, inserting an end of said strip inside a cavity of the pack, so that the small tubes are located within the head of the winding, and tying said winding in the region of the head so as to enclose said small tubes, three parallel and superimposed small tubes, which have an end closed along the strip and the opposite end open, transversally protruding from the end of the strip opposite to the end inserted into the cavity.

Owing to use of the aforementioned protection and positioning element, the method according to the invention may be performed quickly, resulting in the need for less labour as well a reduction in the associated costs and production waste. Moreover, it offers the further advantage that it does not require the employees to perform movements which are particularly demanding and which, in the long run, may result in inflammation of the articulations of the hands and wrists.

A further subject of the present invention consists in a protection and positioning element made of insulating plastic, suitable for use in a method of the type described above and comprising a strip from which three parallel and superimposed small tubes, which have an end closed along the strip and the opposite end open, transversally protrude.

Figure 2:
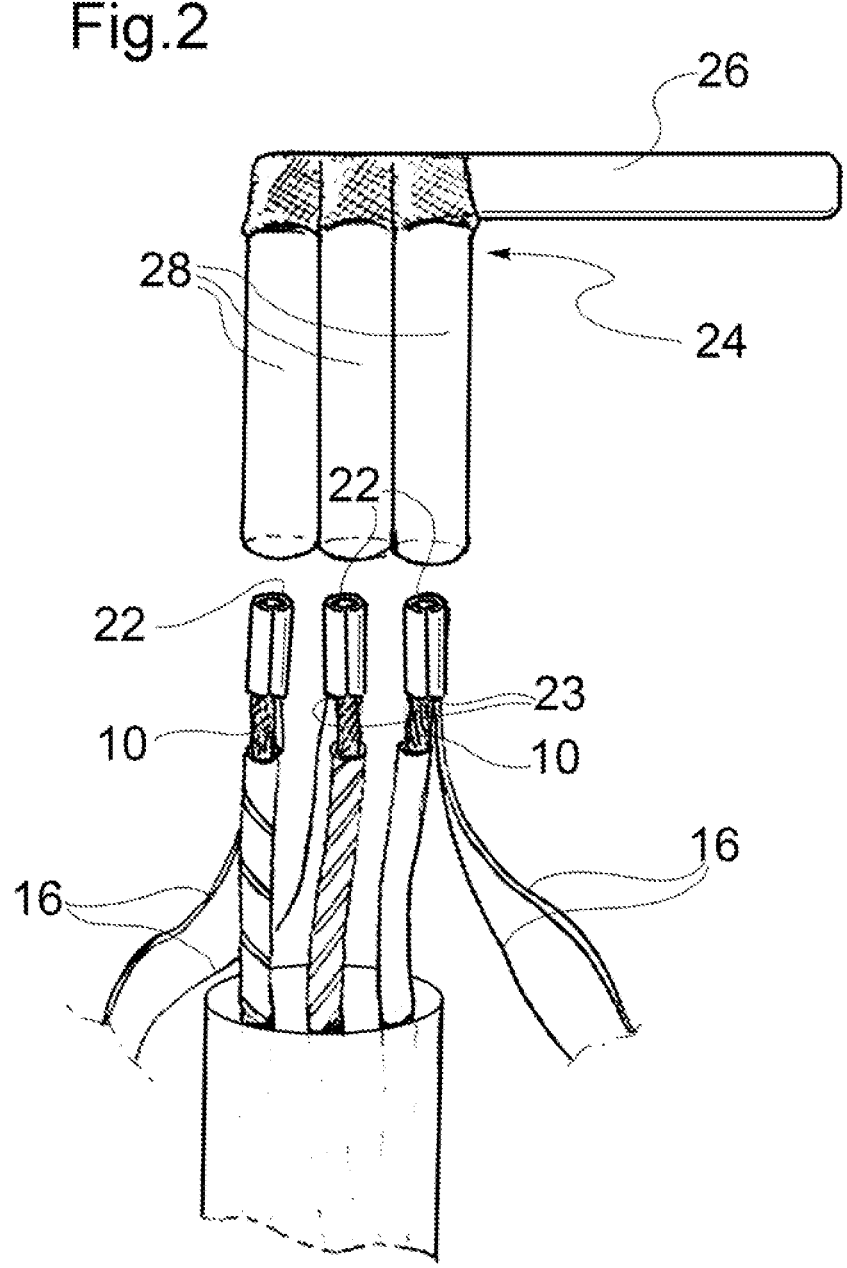
Figure 3:
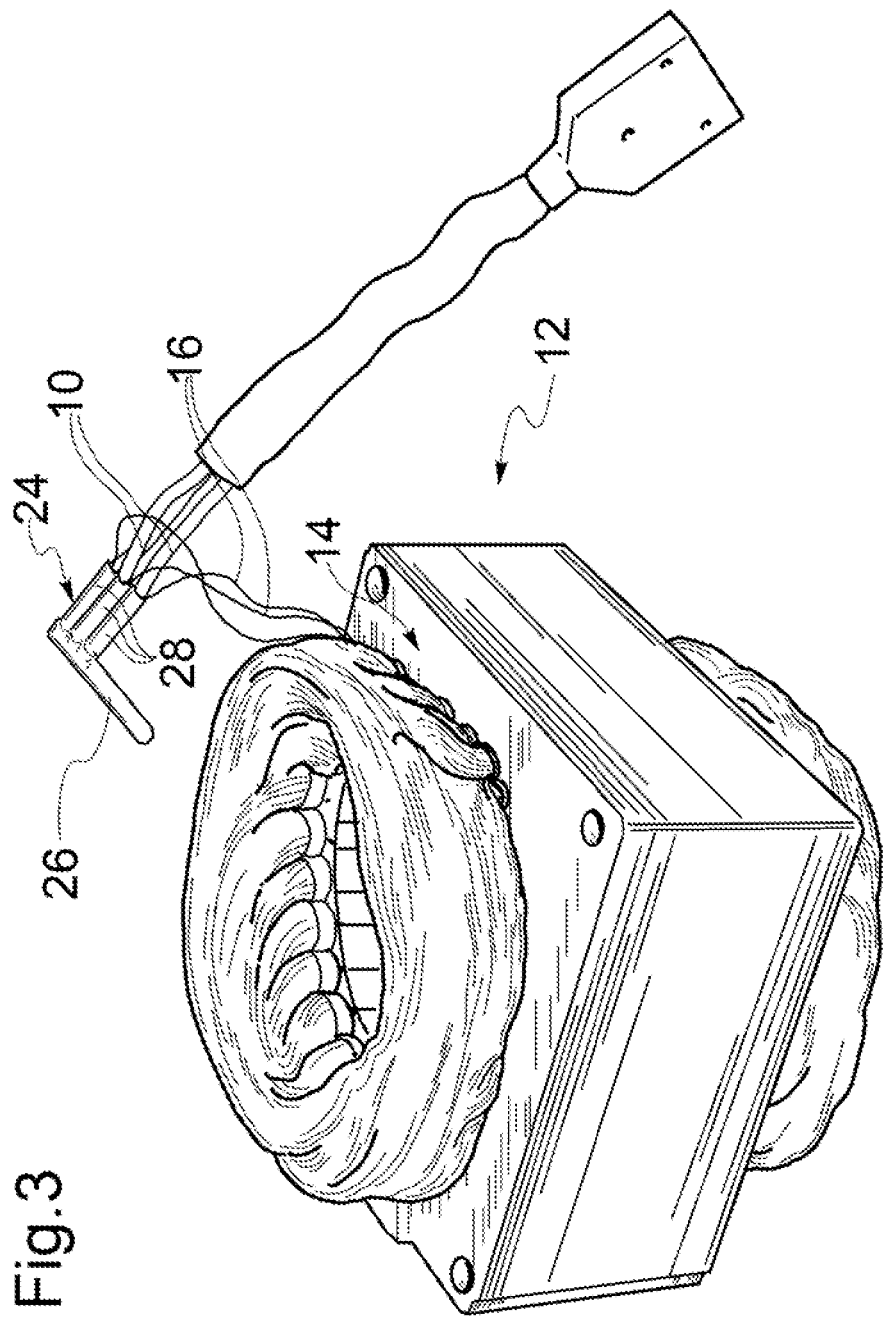
Figure 4:
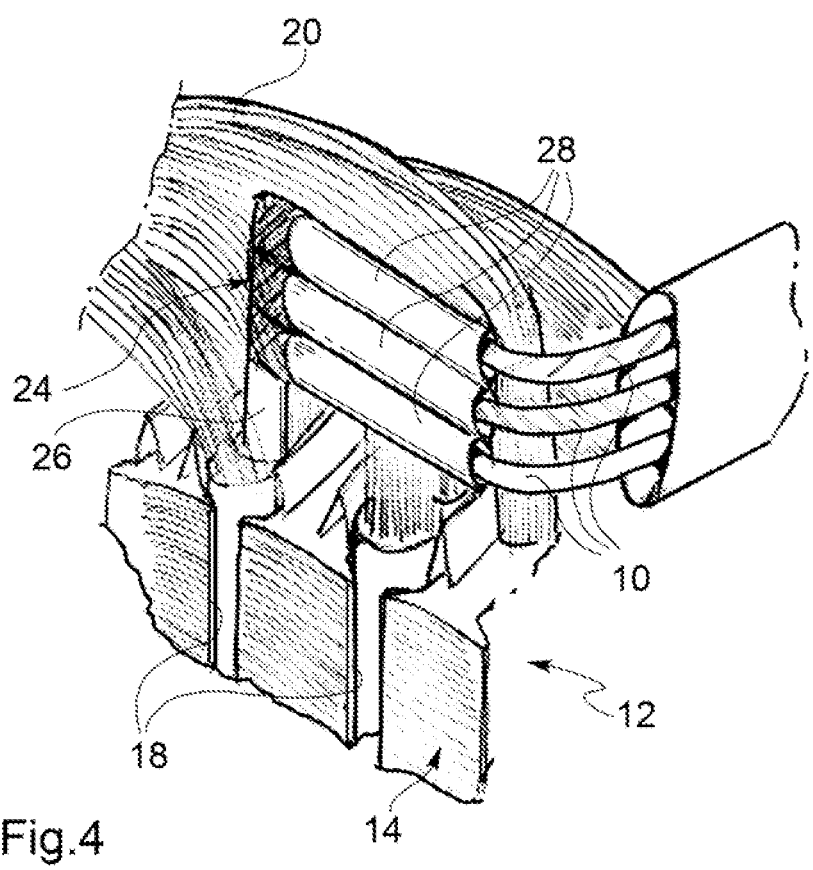

Advantages and characteristic features of the present invention will become clear from the detailed description which follows, provided purely by way of a non-limiting example with reference to the accompanying drawings, in which:

FIGS. 1, 3 and 5 are respective perspective views of a stator unit during various steps of the assembly method according to the invention, FIG. 2 is a perspective view of a number of components during an intermediate step between the steps shown in FIGS. 1 and 3; and FIG. 4 is a perspective view of a number of components during an intermediate step between the steps shown in FIGS. 3 and 5.

The invention shown in the figures listed above envisages assembling (FIG. 1) three electric power supply cables 10 on a stator 12 of an electric motor, in particular a rotary electric motor for hermetic compressors of refrigerators and the like.

The stator 12 comprises in a manner known per se a pack 14 of magnetic laminations and one or more windings formed by a plurality of hanks composed of bundles of electrically conductive wires 16. The windings are housed inside cavities 18 extending axially inside the pack 14 and have heads 20 which project from opposite end faces thereof.

The first step of the method envisages electrically connecting in a conventional manner an end 22 of each cable 10 to an end 23 of at least one respective wire 16 of the winding, thus forming respective pairs 22, 23 of connected ends.

The next step of the method envisages (FIG. 2) using a protection and positioning element 24 made of insulating plastic and comprising a strip 26 from which three parallel and superimposed small tubes 28, which have an end closed along the strip 26 and the opposite end open, transversally protrude. Advantageously, said plastic is a heat-shrinkable plastic, for example that marketed under the trademark MYLAR®, and the small tubes 28 are welded by means of ultrasound to the strip 26.

During this further step, each pair of ends 22, 23 which have been previously connected is inserted (FIG. 3) into the open end of a respective small tube 28 which is then heated so as to cause heat-shrinkage thereof. In this way, each pair of ends 22, 23 is clamped inside the respective small tube 28 so as to be stably fixed there, resulting in the formation of insulated electrical connections between the cables 10 and the wires 16 of the winding.

The end of the strip 26 opposite to the end from which the small tubes 28 extend is then inserted (FIG. 4) inside a cavity 18 of the pack 14 so that the small tubes 28 are located in a stable position inside the head 20 of the winding. Finally the latter may be shaped and tied using conventional techniques (FIG. 5) so as to enclose inside it the small tubes 28 which remain substantially concealed from view to an external observer, without forming abnormal protrusions on the head 20 of the winding or altering its structure.

The electrical and mechanical properties of the assembled stator unit are practically undistinguishable from those of a unit assembled using conventional techniques, but the associated assembly method is decidedly faster and less costly, resulting in a reduction in the processing waste, the labour used and the work-related illnesses affecting the assembly employees.

Obviously, without modifying the principle of the invention, the constructional details and embodiments may be greatly varied with respect to that described purely by way of example, without departing from the scope thereof which is defined in the appended claims.

The invention claimed is:

1. Method for assembling electric power supply cables (10) on a stator (12) of an electric motor, in particular a rotary electric motor for hermetic compressors of refrigerators, which stator (12) is formed by a pack (14) of magnetic laminations and at least one winding of bundles of electrically conductive wires (16), which is housed inside cavities (18) formed in the pack (14) and has at least one head (20) projecting from the pack (14), said method comprising the steps of:

electrically connecting an end (22) of each cable (10) to an end (23) of at least one respective wire (16) of the winding, inserting each pair of connected ends (22, 23) into a respective small tube (28) of a protection and positioning element (24) made of insulating plastic and having a strip (26) from which a number of small tubes (28) at least corresponding to the number of electric power supply cables (10) transversally protrudes, clamping each of the small tubes (28) so as to fix it-each of the small tubes to the pair of ends (22, 23) inserted inside each of the small tubes, inserting an end of said strip (26) inside a cavity (18) of the pack (14), so that said small tubes (28) are located within said head (20) of the winding, and tying said winding in the region of the head (20) so as to enclose said small tubes (28), three parallel and superimposed small tubes (28), which have an end closed along the strip (26) and the opposite end open, transversally protruding from the end of the strip (26) opposite to the end inserted into the cavity (18).

2. The method according to claim 1, wherein both said electric power supply cables (10) and said small tubes (28) are three in number.

3. The method according to claim 1, wherein said element (24) is made of heat-shrinkable plastic so that clamping of the small tubes (28) is performed by applying heat.

4. The method according to claim 1, wherein said plastic is polyester and said small tubes (28) are welded to the strip (26).

* * * * *